(12) United States Patent
Akbas

(10) Patent No.: US 8,866,753 B2
(45) Date of Patent: Oct. 21, 2014

(54) USER INTERFACE

(75) Inventor: M. Omer Akbas, Istanbul (TR)

(73) Assignee: Arcelik Anonim Sirketi, Istanbul (TR)

( * ) Notice: Subject to any disclaimer, the term of this patent is extended or adjusted under 35 U.S.C. 154(b) by 540 days.

(21) Appl. No.: 12/521,576

(22) PCT Filed: Dec. 26, 2007

(86) PCT No.: PCT/EP2007/064554
§ 371 (c)(1),
(2), (4) Date: Jun. 28, 2009

(87) PCT Pub. No.: WO2008/080925
PCT Pub. Date: Jul. 10, 2008

(65) Prior Publication Data
US 2010/0315351 A1    Dec. 16, 2010

(30) Foreign Application Priority Data
Dec. 28, 2006   (TR) ................ a 2006 07584

(51) Int. Cl.
*G06F 3/041* (2006.01)

(52) U.S. Cl.
CPC ............ *G06F 3/0414* (2013.01); *G06F 3/0416* (2013.01)
USPC ........... 345/173; 345/172; 345/174; 345/175; 341/34

(58) Field of Classification Search
USPC ................ 345/156, 172, 173; 463/37; 341/34
See application file for complete search history.

(56) References Cited

U.S. PATENT DOCUMENTS

| | | | |
|---|---|---|---|
| 4,389,711 A | 6/1983 | Hotta et al. | |
| 5,995,877 A * | 11/1999 | Brueggemann et al. | 700/85 |
| 6,404,353 B1 | 6/2002 | Coni et al. | |
| 6,738,042 B1 * | 5/2004 | Nobukiyo | 345/158 |
| 6,741,236 B2 * | 5/2004 | Yun | 345/173 |
| 6,741,237 B1 * | 5/2004 | Benard et al. | 345/173 |
| 7,371,984 B2 * | 5/2008 | Lee et al. | 200/296 |
| 2001/0012987 A1 * | 8/2001 | Matsumoto et al. | 702/189 |
| 2003/0123328 A1 * | 7/2003 | Guanter | 368/82 |
| 2003/0206162 A1 * | 11/2003 | Roberts | 345/173 |
| 2003/0234768 A1 * | 12/2003 | Rekimoto et al. | 345/169 |
| 2004/0085225 A1 * | 5/2004 | Wilson | 340/870.16 |
| 2005/0007339 A1 * | 1/2005 | Sato | 345/156 |
| 2006/0044278 A1 * | 3/2006 | Fux et al. | 345/168 |
| 2006/0097984 A1 * | 5/2006 | Kim | 345/156 |
| 2006/0112347 A1 | 5/2006 | Baudisch | |
| 2007/0188476 A1 * | 8/2007 | Bayramoglu et al. | 345/177 |

FOREIGN PATENT DOCUMENTS

| | | |
|---|---|---|
| EP | 0450129 A | 10/1991 |
| FR | 2757659 A | 6/1998 |
| GB | 1308548 A | 2/1973 |
| WO | 94/02921 A | 2/1994 |

* cited by examiner

*Primary Examiner* — Srilakshmi K Kumar
*Assistant Examiner* — Sosina Abebe
(74) *Attorney, Agent, or Firm* — Venable, Campillo, Logan & Meaney P.C.

(57) ABSTRACT

The present invention relates to a user interface (1) which can be employed in household appliances such as cooking appliances, dishwashers, washing machines, refrigerators, and all appliances which make use of tablets (2), screens etc. with symbols thereon.

8 Claims, 1 Drawing Sheet

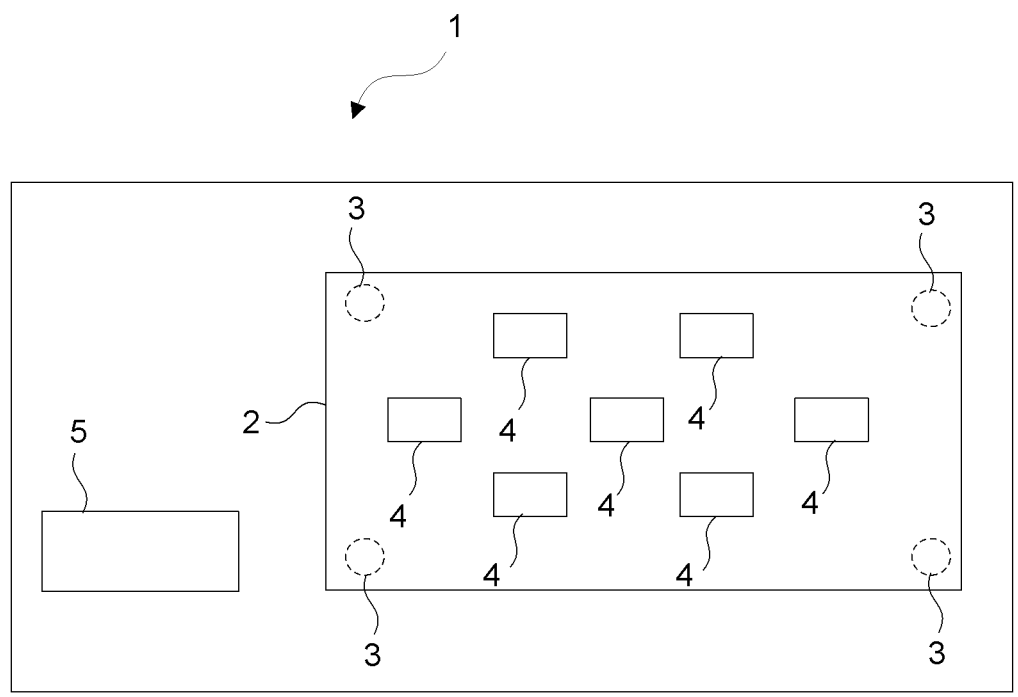

USER INTERFACE

This invention relates to a user interface comprising a touch sensitive tablet, employed particularly in household appliances.

User interaction in devices such as household appliances is maintained by structures containing electromechanical switches and especially by tablets. Electromechanical switches may increase product cost and failure probability. Besides, electromechanical switches used in designing different tablets in a wide range of products, may reveal disparities in type, position, and quantity for different models. These differences may extend the designing period and may increase the cost of production.

In the state of the art, there are touch sensitive tablets which, through sensors (force sensing devices), convert a force exerted upon a tablet into electrical signals, hence ensuring the execution of a pre-set function assigned to the coordinate upon which that force is exerted.

In the state of the art, the British Patent Application Number GB1308548 explains how to evaluate the coordinates of a force exerted on a tablet through the medium of the tablet itself and a minimum number of three force sensing devices integrated thereon.

In the state of the art, the U.S. Pat. No. 4,389,711 demonstrates a touch sensitive tablet or screen. The said document describes a method to calculate accurately the coordinates whereupon a force is exerted.

All touch sensitive applications calculate, in the light of the information that sensors provide, the point upon which a force is applied and ensure the start up of the functions assigned to the respective coordinates.

The aim of this invention is the realization of a user interface comprising a tablet, which enables to pinpoint easily the button, which is pressed.

The user interface realized in order to attain the aim of the present invention and explicated in the first claim and the respective claims, comprises a control unit which, when the user exerts a momentary force over a tablet, compares the momentary sorting of the sensors according to the sensed values with the template sorting patterns particular to each button, and if any overlapping pattern, concludes that the corresponding button has been pressed. A template sorting for each button is obtained—by the sorting of the sensors in ascending descending order according to the sensed values by sensors when that button is pressed.

Thus, there is no need to proceed to any calculation of values sensed by the sensors in order to determine which button is pressed; the sensors are sorted in ascending to descending order according to the sensed values, and then the sorting is compared with the template sorting particular to each button.

In other embodiment of the present invention, when the user interface is in active position, but before any user interaction with the tablet, it's determined the reference values of all sensors, over which the tablet is mounted, by doing measurements with all sensors. Once the user gets into interaction with the tablet, the reference values are subtracted from the momentary values sensed by the sensors, and the order of sensors arranged according to these new values. This avoids problems, which may be due to slipping of the values that the sensors detect and ensures calibration.

The present invention simplifies the design of touch sensitive tablets, augments their diversity, and decreases both production and servicing costs.

A user interface realized in order to attain the aim of the present invention is illustrated in the attached figures, where:

FIG. 1—is a schematic view of the user interface

The elements illustrated in the FIGURES are numbered as follows:
1. User interface
2. Tablet
3. Sensor
4. Button
5. Control unit The user interface (1) comprises a tablet (2) that the user touches to enter data; one or more buttons (4) over the tablet (2) defining the fields upon which the user may exert force, preferably marked with various symbols, and several sensors (3) (several sensors meaning more than one sensor) which are located beneath the tablet (2) that the user touches, positioned so as to remain in contact with the tablet (2), and which when any force exerted on to the tablet (2) sense the force and generate signals.

The tablet (2) is a touch sensitive tablet (2) and is installed on the interface (1) in such a way that all sensors (3) ensuring sensing of any exerted force compress against it. When the user touches on the tablet (2), measurements are done by means of sensors (3) depending on the applied forces on the tablet (2).

The user interface (1) comprises a control unit (5) wherein the manufacturer has stored a template sorting of the sensors (3) in ascending to descending order for each pressed button (4) according to the values sensed by sensors (3). When force is exerted on any one of the buttons (4), the sorting of the sensors in ascending to descending order according to the sensed values is particular to that specific button (4) and is different from those of other buttons (4).

When the user exerts pressure over the tablet (2), the control unit (5) compares the momentary sorting of the sensors (3) in ascending to descending order according to the sensed values by the sensors (3) with the template sorting particular to each button (4), and at the end of this comparison if there is an overlapping pattern, concludes that the button (4) corresponding to that specific sorting has been pressed.

In the case when there is no overlapping between the template sorting of any one of the buttons (4) and the momentary sorting, the user is alerted that has been exerted force over an area where there are no buttons (4).

The determination of the pressed button is through a simple comparison between the template sorting and the momentary sorting of the sensors (3) and, therefore, does not necessitate any knowledge of the coordinates of the point whereupon force has been exerted or any quantitative values sensed by the sensors (3) or any evaluation on such values.

When the user touches the tablet (2), all sensors (3) in contact with the tablet (2) are sorted according to the absolute values that they sense. The importance here is not on the values that the sensors (3) sense but on their absolute values. Hence, the sensors (3) constitute all together a momentary sorting that indicates the point on the tablet (2) whereupon the user has touched. This momentary sorting is compared with the template sorting of the buttons (4); in the case when any one of the template sorting overlaps the momentary sorting of the sensors, the button (4) to which it corresponds is determined, and the control unit (5) performs the functions assigned to that particular button (4).

Symbols may be cut into the surface by various methods (such as serigraphy) or pasted over the buttons (4) on the surface of the tablet (2) to indicate the fields whereupon the user may exert force. These symbols give the user information as to the functions of the buttons (4).

Once the user interface (1) is active position, all sensors (3) become sensitive to sense any force exerted on the tablet (2).

When the user presses on the tablet (2), the sensors (3), over which the tablet (2) is mounted, produce values (signals) in various magnitudes. If the same type of sensors (3) is employed, it is then the sensors (3) positioning which discerns the differences between various signals for a given tablet (2) layout and material.

In order to determine which button (4) is pressed correctly, each sensor (3) sorting which constitutes a template sorting for the buttons (4) must be distinct from the others. Therefore, the number of sensors (3) may also elicit the highest number of buttons (4) on a tablet (2) that can be correctly determined. For example; when 4 sensors (3) are employed, a maximum number of 24 (4!) buttons (4) and when 3 sensors (3) are employed, a maximum number of 6 (3!) buttons (3) can be accurately determined.

Each sorting is differentiated from the others, thereby differentiation of the buttons (4) on the tablet (2) by the modification of parameters related to the number of buttons (4), size of the buttons (4), position of the buttons (4), number of sensors (3), type of sensors (3), and positioning of the sensors (3).

In one other embodiment of the present invention, when the user interface (1) is active position but before any user interaction with the tablet (2), measurements are made by all sensors (3) which in contact the tablet (2), hence determining reference values. Once the user gets into interaction with the tablet (2), the reference values are subtracted from the momentary values sensed by the sensors (3), and the sorting of the sensors (3) according to the resulting values constitutes the momentary sorting of sensors (3). This calibration process helps avoid any slipping problem that may arise in the course of time in the values sensed by the sensors (3). In this embodiment, the user should be warned not to touch the tablet (2) in any way whatsoever, vocally or visually, throughout the determination process of reference values.

In this invention, the sensors (3) may sorted either ascending to descending order or descending to ascending order according to the sensed values by the sensors (3)

The user interface (1) can be employed in household appliances such as cooking appliances, dishwashers, washing machines, refrigerators, and all appliances that, for user interface (1), make use of screens and panels with symbols thereon.

The present invention not only helps to easily determine which one of the buttons (4) over a tablet (2) is pressed but also signals when there is no button (4) pressed. Besides, it simplifies the designing of touch sensitive tablets (2), augments diversity, and decreases both production and servicing costs.

The invention claimed is:

1. A user interface (1) comprising a tablet (2) that can be touched by the user to enter data, one or more buttons (4) over the tablet (2) defining fields upon which the user may apply force, marked with symbols, and sensors (3) which are located beneath the tablet (2), positioned so as to remain in contact with the tablet (2), and which all sensors sense any force exerted onto the tablet (2) and generate signals by sensing the force which are sensed values for each of the sensors; and further comprising a control unit (5): wherein a template is stored for sorting of the sensors (3) according to the sensed values in ascending to descending order for each pressed button (4) and the control unit (5) compares a momentary sorting of all of the sensors (3) in ascending to descending order according to the sensed values, without need to proceed to any calculation of the sensed values, by the sensors (3) when the user applies force over the tablet (2) to the template sorting particular to each button (4), and to conclude at the end of this comparison if there is an overlapping pattern between the template sorting and the momentary sorting of the sensors, that the button (4) corresponding to that specific overlapping pattern has been pressed.

2. The user interface (1) as in claim 1, wherein the control unit (5) being configured to conclude, in the case when there is no overlapping pattern between the template sorting of sensors (3) of any one of the buttons (4) and the momentary sorting concludes that the force has been exerted in an area where there are no buttons (4) the force has been exerted in an area where there are no buttons (4).

3. The user interface (1) as in claim 2, wherein the control unit (5) being configured to alert the user if is concluded that force has been exerted in an area without buttons (4).

4. The user interface (1) as in claims 2 or 3 wherein the control unit (5) being configured to, when the user interface (1) is active position but before user interaction with the tablet (2), determine reference values of the sensors (3) by measurements done by the sensors (3) which are in contact with the tablet (2), and being configured to, once the user interacts with the tablet (2), subtracts the reference values from the values sensed by the sensors (3), and arranges the sensors (3) according to the resulting values to obtain the momentary sorting.

5. A cooking device wherein the user interface (1) as in claims 2 or 3.

6. A dishwasher wherein the user interface (1) as in any one of claims 2 or 3.

7. A washing machine wherein the user interface (1) as in claims 2 or 3.

8. A refrigerator wherein the user interface (1) as in claims 2 or 3.

* * * * *